(12) United States Patent
Hollender et al.

(10) Patent No.: US 8,742,918 B2
(45) Date of Patent: Jun. 3, 2014

(54) ALARM MANAGEMENT SYSTEM

(75) Inventors: Martin Hollender, Dossenheim (DE); Rene Söllner, Riesa (DE)

(73) Assignee: ABB Technology AG, Zurich (CH)

( * ) Notice: Subject to any disclaimer, the term of this patent is extended or adjusted under 35 U.S.C. 154(b) by 272 days.

(21) Appl. No.: 13/292,806

(22) Filed: Nov. 9, 2011

(65) Prior Publication Data

US 2012/0119901 A1    May 17, 2012

Related U.S. Application Data

(63) Continuation of application No. PCT/EP2010/002680, filed on May 3, 2010.

(30) Foreign Application Priority Data

May 13, 2009   (DE) .......................... 10 2009 021 062

(51) Int. Cl.
*G08B 23/00*    (2006.01)

(52) U.S. Cl.
USPC ............ 340/501; 340/506; 340/3.1; 340/511; 340/521

(58) Field of Classification Search
USPC .................................. 340/506, 3.1, 511, 521
See application file for complete search history.

(56) References Cited

U.S. PATENT DOCUMENTS

| 5,062,147 | A | | 10/1991 | Pickett et al. |
|---|---|---|---|---|
| 5,400,246 | A | * | 3/1995 | Wilson et al. .................. 700/17 |
| 5,581,242 | A | | 12/1996 | Arita et al. |
| 6,513,129 | B1 | | 1/2003 | Tentij et al. |
| 6,766,368 | B1 | | 7/2004 | Jakobson et al. |
| 7,111,205 | B1 | | 9/2006 | Jahn et al. |
| 2006/0190584 | A1 | | 8/2006 | Skold et al. |
| 2007/0239291 | A1 | | 10/2007 | Wayland et al. |

FOREIGN PATENT DOCUMENTS

WO    WO 02/086750 A1   10/2002

OTHER PUBLICATIONS

International Search Report (PCT/ISA/210) issued on Dec. 21, 2010, by European Patent Office as the International Searching Authority for International Application No. PCT/EP2010/002680.
German Search Report for DEe 102009021062.8 dated Jan. 18, 2010.
J.E. Larsson et al., "Alarm Reduction and Root Cause Analysis for Nuclear Power Plant Control Rooms", 2005, 11 pages, retrieved from the internet: http://vwvvv.goalart.com/en/newsandpublications/publications.asp.
M. Bray et al., "Practical Alarm Filtering", Intech, Feb. 1, 1994, pp. 34-36, vol. 41, No. 2.

\* cited by examiner

*Primary Examiner* — Daryl Pope

(74) *Attorney, Agent, or Firm* — Buchanan Ingersoll Rooney PC

(57) ABSTRACT

An exemplary alarm management system and method for the management of alarm messages of a technical installation or of a technical process are disclosed. A data processing system receives alarm messages. A plurality of display modules display the alarm messages. The data processing system includes a module for creating alarm channels for different ways of representing the pending alarm messages. Each alarm channel created by the module is associated with one of the display modules, and the display modules present the pending alarm messages as ate least one of lists, alarm clouds, and displays in conjunction with at least one of acoustic signals and alarm records.

17 Claims, 3 Drawing Sheets

ALARM MANAGEMENT SYSTEM

RELATED APPLICATIONS

This application claims priority as a continuation application under 35 U.S.C. §120 to PCT/EP2010/002680, which was filed as an International Application on May 3, 2010, designating the U.S., and which claims priority to German Patent Application No. 102009021062.8 filed on May 13, 2009. The entire contents of these applications are hereby incorporated by reference in their entireties.

FIELD

The disclosure relates to an alarm management system and to a method for managing alarm messages including measured values, process variables and/or status messages of a technical installation or a technical process and is particularly suitable for graphically presenting process alarms in power plants and other large-scale technical installations.

BACKGROUND INFORMATION

Alarm systems are crucial devices of monitoring systems or control systems of technical installations, for example power plant installations or production installations, and are an important aid for the operating personnel in order to detect installation or process states which specify immediate intervention. The method of operation of the alarm systems for determining and displaying installation or process states is determined by alarm messages, that is to say by defined limit values of process variables, for example. The operators of the installations are provided with these alarm messages in a wide variety of ways.

A so-called alarm panel is used to assign a defined region inside a graphical presentation to each alarm message. If a limit value assigned to this alarm message is exceeded or undershot, the color of the region changes or the region begins to flash, for example.

A further type of presentation from known systems is the use of a list to list the pending alarm messages, the respectively new alarms being continuously added at the start or end of the list. In this case, those alarms which have not yet been acknowledged by the operator are marked in color or are signaled using a flashing signal. In order to indicate alarm messages in terms of their priority, different font colors are used for the respective priority of the alarm message and acoustic signals are used for high-priority alarm messages, but said signals produce non-negligible noise in the long run.

The practice of notifying the operators of the installation using SMS services or emails is also known from the existing systems. However, this form of notification can only be used when the alarm messages do not exceed a certain number, but this is often not the case in large-scale technical installations.

The above-mentioned methods for presenting alarms in large-scale technical installations do not make it possible at all to identify temporal relationships between the pending alarm messages or make this possible only with difficulty. With a high volume of alarms, the installation operators are quickly overtaxed and cannot respond with the necessary measures in good time. Acoustic signals and messages using SMS and email notifications are often also switched off since the respective service is otherwise overtaxed by the multiplicity of pending alarm messages.

SUMMARY

An exemplary alarm management system for managing alarm messages of a technical installation or a technical process, comprises a data processing device for receiving the alarm messages; and a plurality of display modules for presenting the alarm messages, wherein the data processing device includes a module for creating alarm channels for different types of presentation of each pending alarm message, wherein each of the created alarm channels is assigned to one of the display modules, and wherein each display module provides types of presentation for the alarm messages in the form of at least one of lists, alarm clouds, and presentations in conjunction with at least one of acoustic signals and alarm histories.

An exemplary method for managing alarm messages of a technical installation or a technical process is disclosed. The method comprises creating alarm channels for different types of presentation of each pending alarm message; assigning the created alarm channel to one of a plurality of display modules; and presenting alarm messages at least one of the plurality of display modules, wherein each display module presents the pending alarm messages as at least one of lists, alarm clouds, and presentations in conjunction with at least one of acoustic signals and alarm histories.

BRIEF DESCRIPTION OF THE DRAWINGS

The disclosure and its advantages and refinements are described further below using exemplary embodiments which are illustrated in figures of the drawing, in which.

DETAILED DESCRIPTION

Figure 1:
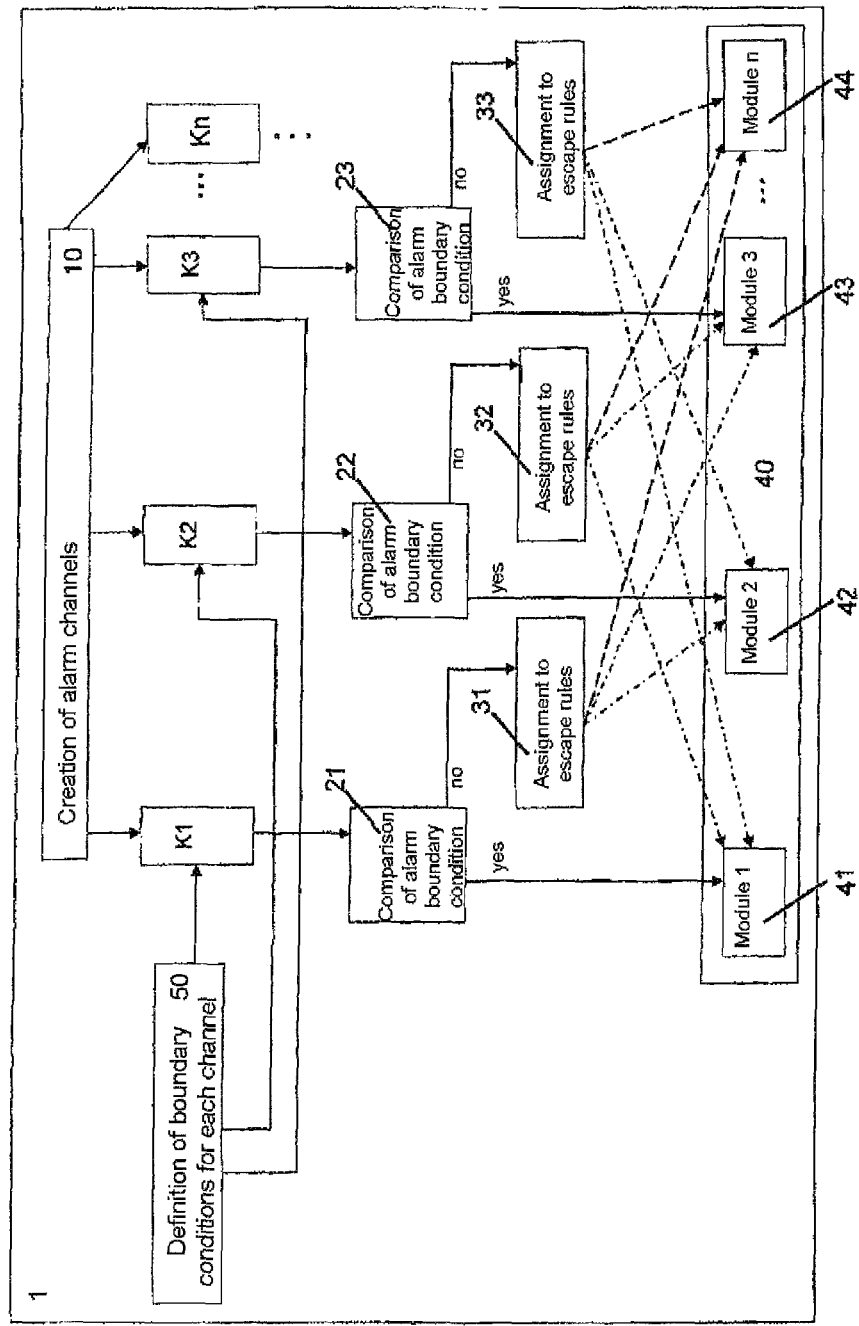
FIG. 1 shows a system for managing pending alarm messages in accordance with an exemplary embodiment.

Exemplary embodiments of the present disclosure are directed to specifying an alarm management system and a method for managing alarms including measured values, process variables and/or status messages of a technical installation or a technical process, as a result of which the abovementioned disadvantages of the known systems are overcome, and which is suitable, in particular, for clearly graphically presenting process alarms in power plants and other large-scale technical installations.

To manage alarm messages, an exemplary alarm management system of the present disclosure uses measured values, process variables and/or status messages of a technical installation or a technical process and includes a data processing device to which the alarm messages can be supplied and can be presented using display modules.

An exemplary data processing device has a module for creating alarm channels for different types of presentation of the respectively pending alarm messages, the alarm channel created using the module respectively being assigned to one of the display modules. The created alarm channels are in the form of communication channels which transmit the alarm messages to the display modules.

In an exemplary embodiment of the present disclosure, the alarms can be presented, for example, in the form of a list and/or in conjunction with acoustic signals. The alarm channels can also be linked to electronic message transmission by email or SMS, as a result of which it is advantageously possible for the operator of the technical installation or the technical process to receive and/or evaluate an alarm message assigned to him even outside a control system or a control room of the installation.

Boundary conditions with respect to an assignment to the corresponding display module are respectively allocated to the created channel. An exemplary boundary condition for the channel for presenting the acoustic signals can be, for example, the volume of a signal in the control room of the installation. The maximum number of alarm messages which can be displayed within a defined period of time and/or a previously defined number of high-priority alarm messages, for example, can be assigned, as boundary conditions, to the created channel for presenting the alarm messages in the form of lists. The fact that a limited number of SMSs or emails with regard to pending alarm messages are transmitted and displayed to an installation operator within a working day can also be defined as a boundary condition for the respective channel.

An exemplary embodiment according to the present disclosure provides for channels to be created for the control room formed by one of the data processing device, the boundary conditions of which channels define, for example, that a maximum of two low-priority alarm messages are displayed and/or acoustically signaled in the control room.

Another exemplary embodiment of the present disclosure provides for the alarm messages to be compared with the associated boundary conditions for a match using a comparison module for each channel. Those alarm messages which match the predefined boundary conditions of the respective channel can be supplied to the corresponding display module of the respective channel for the purpose of presentation. Those alarm messages which do not match the associated boundary conditions with respect to an assignment to the corresponding display module can be supplied to a selection module, can be checked for a match with previously defined escape rules for assignment to the respective display module and can be transmitted to the corresponding display modules for the purpose of presentation according to the conditions respectively defined in the escape rules.

The escape rules define the conditions under which no more alarm messages can be supplied to one of the previously created channels.

For example, a rule-based evaluation can be carried out by means of escape rules according to the following conditions:

Use channel 1 which is intended to present the alarm message in the form of an SMS for operator 1.

If channel 1 is not available or is overtaxed as a result of displaying too many alarm messages, the alarm message is intended to be forwarded to channel 2 which is intended to present the alarm message in the form of an SMS for operator 2.

If channel 2 is not available either, the alarm message is intended to be signaled to the control room and displayed there.

The following condition describes another example of an escape rule:

If more than two high-priority alarms are pending in the corresponding channel, all pending alarm messages with a lower priority should be transmitted to an intermediate buffer, for example for archiving and/or subsequent evaluation and analysis.

An alarm management system according to an exemplary embodiment of the present disclosure advantageously results in the viewers of the display module respectively assigned to the corresponding channel no longer being overtaxed, in particular even when there is a high volume of pending alarm messages, since they only receive the alarm messages on their display module and can also process said messages in an appropriate time and can respond to said messages with the necessary measures.

Another exemplary embodiment of the present disclosure is directed to a method for managing alarm messages including measured values, process variables and/or status messages of a technical installation or a technical process, the alarm messages being presented using display modules. An exemplary method according to the present disclosure is carried out using a data processing device, the data processing device having access to the alarm messages from the process or the installation.

In an exemplary embodiment of the present disclosure, alarm channels can be created for different types of presentation of the respectively pending alarm messages, the respectively created alarm channel is respectively assigned to one of the display modules for the different types of presentation, and the display modules provide types of presentation for the pending alarm messages in the form of lists, alarm clouds, presentations in conjunction with acoustic signals and/or alarm histories.

An exemplary sequence of the method according to the present disclosure is explained using the method steps described below.

In a first step, alarm channels are created for different types of presentation of the respectively pending alarm messages and the alarm channels created for the different types of presentation are respectively assigned to a corresponding display module.

In a second step, boundary conditions with respect to an assignment to the corresponding display module are respectively defined for the created channels and, in a third step, the pending alarm messages are compared with the associated boundary conditions for a match for each channel.

In a fourth method step, those alarm messages which match the associated boundary conditions of the respective channel are supplied to the corresponding display module of the respective channel for the purpose of display.

Those alarm messages which do not match the associated boundary conditions with respect to an assignment to the corresponding display module are supplied to a selection module in a further step and are checked for a match with previously defined escape rules for assignment to the respective display module.

In a final step, the alarm messages checked with the escape rules in the preceding step are transmitted to the corresponding display modules for the purpose of presentation according to the conditions respectively defined in the escape rules.

FIG. 1 shows a system for managing pending alarm messages in accordance with an exemplary embodiment. As shown in FIG. 1, an exemplary alarm management system 1 has access to alarm messages of a power plant installation.

The alarm messages can be supplied to the system 1 according to the disclosure for managing pending alarm messages including measured values, process variables and/or status messages of the power plant installation, for example from a data processing device, and can be presented using a display unit 40 including display modules 41, 42, 43, 44.

An alarm management system 1 according to an exemplary embodiment of the present disclosure includes a module for creating alarm channels 10. The alarm channels K1, K2, K3, . . . Kn created using the module 10 are set up for different types of presentation of the respectively pending alarm messages, the alarm channels K1, K2, K3 . . . Kn for the different types of presentation each being able to be assigned to the corresponding display module 41, 42, 43, . . . 4n of the display unit 40. The alarm messages which can be assigned to the first channel K1 are presented in the form of a list, for example, for the first created channel K1 and the alarm messages which can be assigned to the second channel K2 are presented in the form of an acoustically accompanied alarm display, for example, for the second created channel K2.

Boundary conditions 50 (which are also referred to as attributes below) with respect to an assignment to the corresponding display module 41, 42, 43, . . . 4n are defined for the created channels K1, K2, K3 . . . Kn in accordance with the method according to the disclosure. For example, different font sizes and/or different colors are allocated to the first channel K1 for displaying the associated alarm messages and different volumes are allocated to the second channel K2 on the basis of the priority of the respectively pending alarm message as boundary conditions 50.

For each channel K1, K2, K3 . . . Kn, the alarm messages can be compared with the associated boundary conditions 50 for a match using comparison modules 21, 22, 23 integrated in the alarm management system 1.

Those alarm messages which match the associated boundary conditions 50 of the respective channel K1, K2, K3 . . . Kn can be supplied to the corresponding display module 41, 42, 43 . . . 4n of the respective channel for the purpose of presentation to the effect that, for example, a first alarm message which matches the boundary condition 50 for the first channel K1 is presented by the first display module 41.

Those alarm messages which do not match the associated boundary conditions 50 with respect to an assignment to the corresponding display module 41, 42, 43 . . . 4n can be supplied to a selection module 31, 32, 33 and can be checked for a match with previously defined escape rules for assignment to the respective display module 41, 42, 43 . . . 4n and can be transmitted to the corresponding display modules 41, 42, 43 . . . 4n for the purpose of presentation according to the result of the check and the conditions respectively defined in the escape rules. For example, a second alarm message which is actually intended for the second channel K2 is not assigned to the second display module 42 on account of temporary overloading of the second channel K2 but rather is transmitted to a further display module 44, the receiving capacity of which for pending alarm messages has not yet been reached according to the predefined escape rules.

Figure 2:
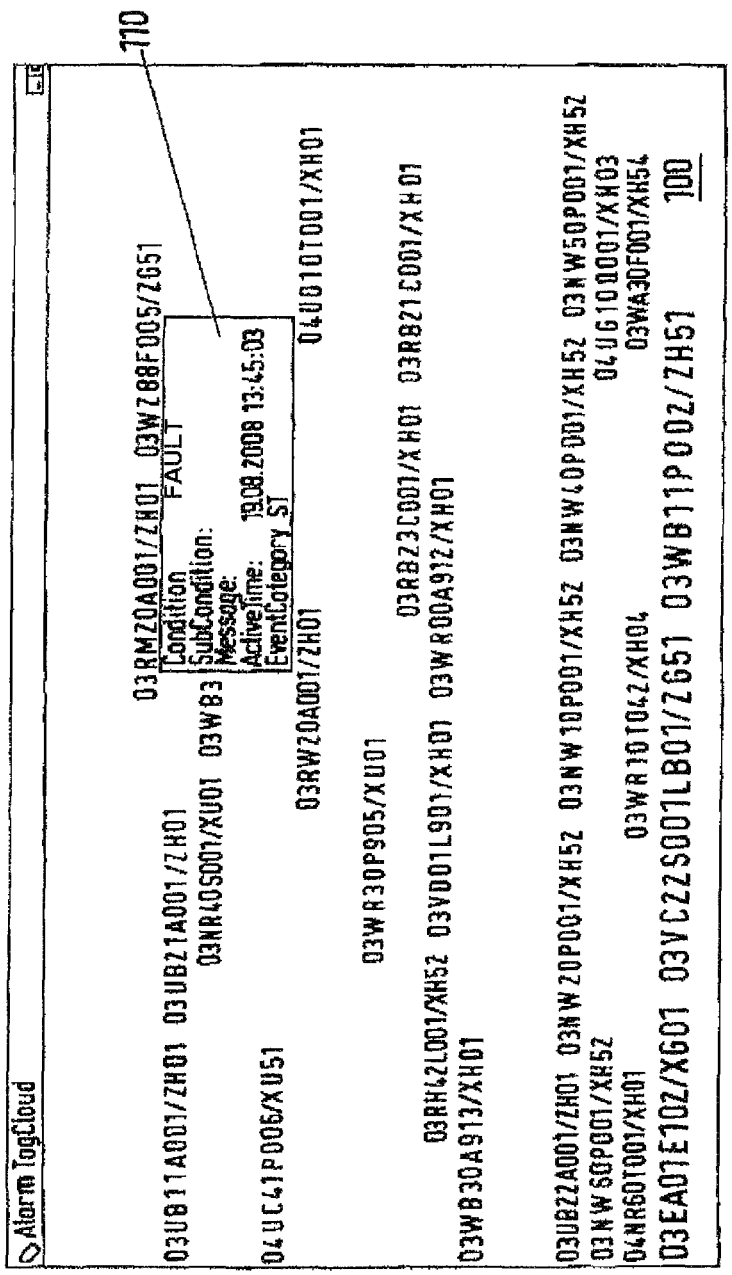
FIG. 2 shows a display module for presenting alarm messages using an alarm cloud in accordance with an exemplary embodiment.

FIG. 2 shows a display module for presenting alarm messages using an alarm cloud in accordance with an exemplary embodiment. As shown in FIG. 2, an exemplary display module for visualizing alarms in the control room or control system of a power plant uses an alarm cloud 100.

The type of presentation of the alarm messages in the form of an alarm cloud on the display module 41, 42, 43, 44 provides the following boundary conditions 50 for example: sequence, font size, font color, font transparency, font flashing of the corresponding alarm message. In an exemplary embodiment of the present disclosure, these boundary conditions 50 can be linked in any desired manner to the properties of the alarms, for example their priority, up-to-dateness, the time frame in which a response to the message should be given or how often the alarm has already been activated.

In comparison with the known alarm lists in which only a sequence, a particular color for indicating the priority of the message and/or flashing for the request to acknowledge the displayed alarm message is/are usually used as a type of presentation, further attributes 50, for example the font size and the font transparency of the displayed alarm message, can now be advantageously visualized. Detailed information relating to the alarms can be made available on request, for example in the form of a displayed temporary window, if the cursor on the screen of the data processing device is guided over a corresponding field or a corresponding region on the screen or if a corresponding entry is clicked on or selected.

The pending alarm messages are sorted according to their priority, for example in a list, and are then displayed in the form of a large-area window 110 according to a previously defined boundary condition 50.

The fact that individual differently weighted alarm messages are presented in the display module 41, which is in the form of a list, in the size of their presentation or by means of color highlights can also be defined as a boundary condition 50.

Figure 3:
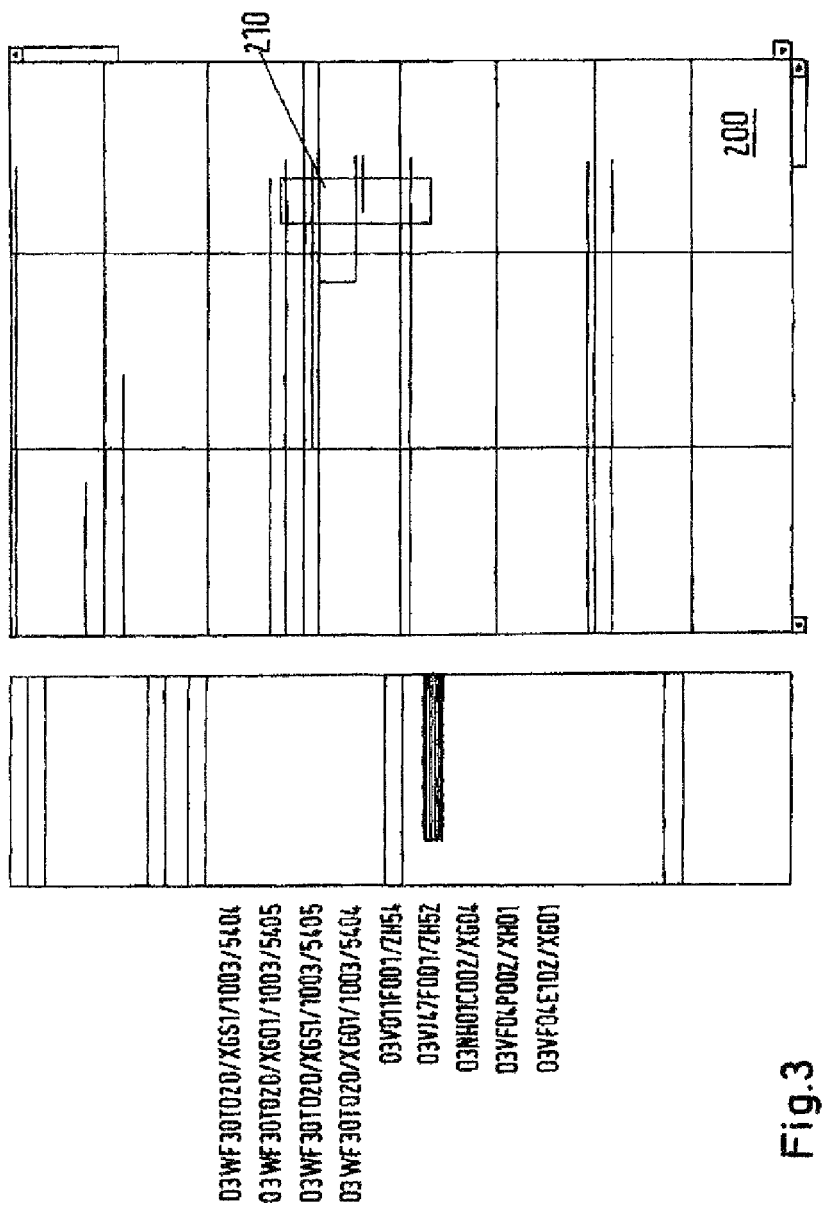
FIG. 3 shows another display module for presenting pending alarm messages using an alarm recording which shows a temporal profile of pending alarms in accordance with an exemplary embodiment.

FIG. 3 shows another display module for presenting pending alarm messages using an alarm recording which shows a temporal profile of pending alarms in accordance with an exemplary embodiment. As shown in FIG. 3, the display module for presenting pending alarm messages by means of an alarm recording 200 which shows a duration and temporal relationships or the temporal profile of pending alarms. The alarm presentation according to FIG. 3 is also referred to as an alarm history.

In the exemplary presentation shown in FIG. 3, it is possible to discern in a considerably better manner, for example, if a plurality of alarms occurred at the same time and/or were active only for a short time. In addition, different conditions such as priority, status or duration can be intuitively visualized by means of different colors and brightnesses. Since the line width can be limited to one pixel in the extreme case, a large number of alarms can also be visualized. Further details such as the name of the alarm, a time stamp or explanatory text for the alarms are available using a displaceable magnification device 210, also called a magnifying glass.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An alarm management system for managing alarm messages of a technical installation or a technical process, comprising:

a data processing device for receiving the alarm messages; and a plurality of display modules for presenting the alarm messages, wherein the data processing device includes a module for creating alarm channels for different types of presentation of each pending alarm message, wherein each of the created alarm channels is assigned to one of the display modules, wherein each display module provides types of presentation for the alarm messages in the form of at least one of lists, alarm clouds, and presentations in conjunction with at least one of acoustic signals and alarm histories, wherein the created alarm channels are communication channels and transmit the alarm messages to the display modules, wherein boundary conditions with respect to an assignment to a corresponding display module are associated with each created channel, and wherein a comparison module for each channel compares the alarm messages with the associated boundary conditions, such that those alarm messages which match the associated boundary conditions of the respective channel are supplied to the corresponding display module of a respective channel for presentation, and those alarm messages which do not match the associated boundary conditions with respect to an assignment to the corresponding display module are supplied to a selection module, are checked for a match for assignment to a display module according to a rule-based evaluation, and are transmitted to the associated display module for presentation.

2. The alarm management system of claim 1, wherein at least one alarm channel is linked to electronic message transmission by email or SMS.

3. The alarm management system as claimed in claim 1, wherein the alarm messages are formed from at least one of measured values, process variables, and status messages of a technical installation or a technical process.

4. The alarm management system as claimed in claim 1, wherein the boundary conditions with respect to an assignment to one of the display modules are at least one of a volume of a signal in a control room of the installation, a maximum number of alarm messages which can be displayed within a defined period of time, and a previously defined number of high-priority alarm messages.

5. The alarm management system as claimed in claim 1, wherein the boundary conditions with respect to an assignment to one of the display modules are a previously determined number of SMSs or emails which can be transmitted with regard to pending alarm messages.

6. The alarm management system as claimed in claim 1, wherein channels are created for a control room formed by one of the data processing device and the boundary conditions of which channels define that a previously defined number of pending alarm messages of a previously defined priority can be at least one of displayed and acoustically signaled in the control room.

7. An alarm management system for managing alarm messages of a technical installation or a technical process, comprising:
   a data processing device for receiving the alarm messages; and
   a plurality of display modules for presenting the alarm messages,
   wherein the data processing device includes a module for creating alarm channels for different types of presentation of each pending alarm message,
   wherein each of the created alarm channels is assigned to one of the display modules,
   wherein each display module provides types of presentation for the alarm messages in the form of at least one of lists, alarm clouds, and presentations in conjunction with at least one of acoustic signals and alarm histories, and
   wherein the rule-based evaluation is performed using escape rules including:
   the alarm message is intended for a first channel which is intended to present the alarm message as an SMS for a first operator, and if the first channel is not available or if the first channel is overtaxed as a result of displaying a previously defined number of pending alarm messages, the alarm message should be forwarded to a second channel.

8. The alarm management system as claimed in claim 1, wherein the rule-based evaluation is carried out by means of escape rules according to:
   if more than two high-priority alarms are pending in the channel, all pending alarm messages with a lower priority should be transmitted to an intermediate buffer, for at least one of archiving and subsequent evaluation and analysis.

9. A method for managing alarm messages of a technical installation or a technical process, comprising:
   creating alarm channels as communication channels for different types of presentations of each pending alarm message;
   assigning the created alarm channel to one of a plurality of display modules;
   presenting alarm messages at at least one of the plurality of display modules, wherein each display module presents the pending alarm messages as at least one of lists, alarm clouds, and presentations in conjunction with at least one of acoustic signals and alarm histories;
   transmitting the alarm messages to the display modules over the communication channels;
   defining boundary conditions for each created channel with respect to an assignment of a corresponding display module; and
   comparing each alarm message with associated boundary conditions for each channel,
   wherein those alarm messages which match the associated boundary conditions of the respective channel are supplied to the corresponding display module of a respective channel for presentation, and
   wherein those alarm messages which do not match the associated boundary conditions with respect to an assignment to the corresponding display module are supplied to a selection module, are checked for a match for assignment to a display module according to a rule-based evaluation, and are transmitted to the associated display module for presentation.

10. The method as claimed in claim 9, comprising:
    linking at least one alarm channel to electronic message transmission by email or SMS.

11. The method as claimed in claim 9, comprising:
    forming the alarm messages from at least one of measured values, process variables, and status messages of a technical installation or a technical process.

12. The method as claimed in claim 9, comprising:
    forming the boundary conditions with respect to an assignment to one of the display modules from at least one of a volume of a signal in the control room of the installation, a maximum number of alarm messages which can be displayed within a defined period of time, and a previously defined number of high-priority alarm messages.

13. The method as claimed in claim 9, comprising:
    forming the boundary conditions with respect to an assignment to one of the display modules by a number of SMSs or emails which can be transmitted with regard to pending alarm messages.

14. The method as claimed in claim 9, comprising:
    creating channels for a control room formed by one of the data processing device, wherein the boundary conditions of which channels define that a previously defined number of pending alarm messages of a previously defined priority are at least one of displayed and acoustically transmitted in the control room.

15. The method as claimed in claim 9, comprising:
    performing a rule-based evaluation using escape rules having conditions including at least one of:
    the alarm message is intended for a first channel which is intended to present the alarm message as an SMS for a first operator, and if the first channel is not available or if the first channel is overtaxed as a result of displaying a previously defined number of pending alarm messages, the alarm message should be forwarded to a second channel, and if more than two high-priority alarms are pending in the channel, all pending alarm messages with a lower priority should be transmitted to an intermediate buffer, for at least one of archiving and subsequent evaluation and analysis.

16. The alarm management system as claimed in claim 1, wherein a first channel is configured to present associated alarm messages as a list, and a second channel is configured to present associated alarm messages in conjunction with acoustic signals.

17. The method as claimed in claim 9, comprising:
creating a first channel that is configured to present associated alarm messages as a list; and
creating a second channel that is configured to present associated alarm messages in conjunction with acoustic signals.

* * * * *